No. 873,142.  
PATENTED DEC. 10, 1907.  
W. E. WILHELM.  
DISK SCRAPER.  
APPLICATION FILED MAR. 26, 1907.  
2 SHEETS—SHEET 1.
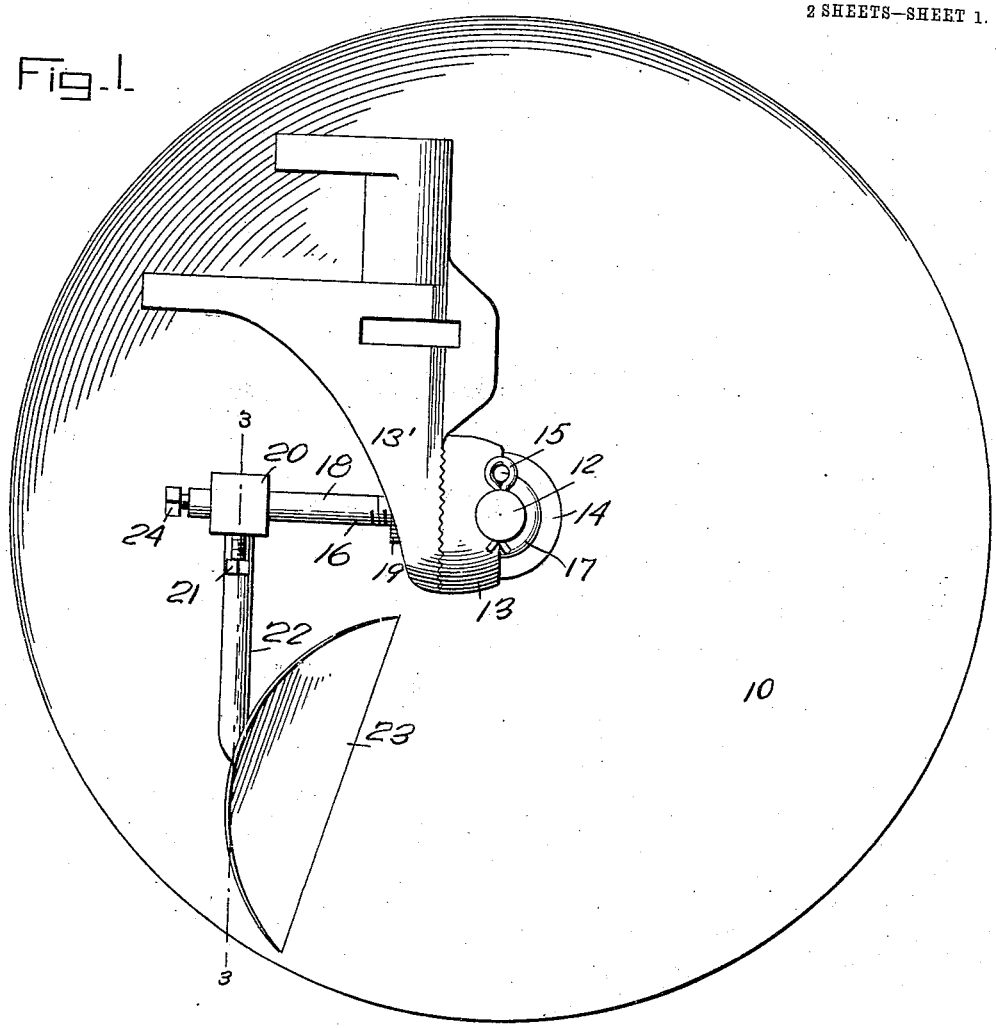
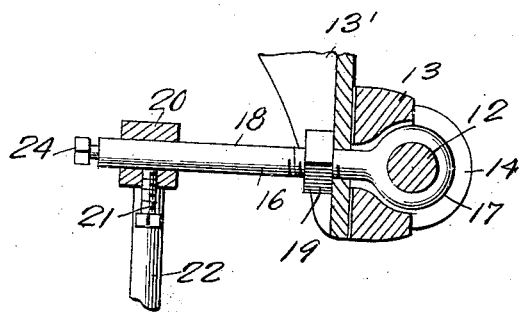
Witnesses  
G. R. Thomas  
Arthur W. Crossley
Inventor  
W. E. Wilhelm
Attorneys No. 873,142. PATENTED DEC. 10, 1907.
W. E. WILHELM.
DISK SCRAPER.
APPLICATION FILED MAR. 26, 1907.

2 SHEETS—SHEET 2.

Witnesses
G. R. Thomas
Arthur W. Crossley

Inventor
W. E. Wilhelm
By Chandler & Chandler
Attorneys

UNITED STATES PATENT OFFICE.

WALTER E. WILHELM, OF PALMYRA, NEBRASKA.

DISK-SCRAPER.

No. 873,142.  Specification of Letters Patent.  Patented Dec. 10, 1907.

Application filed March 26, 1907. Serial No. 364,574.

*To all whom it may concern:*

Be it known that I, WALTER E. WILHELM, a citizen of the United States, residing at Palmyra, in the county of Otoe, State of Nebraska, have invented certain new and useful Improvements in Disk-Scrapers; and I do hereby declare the following to be a full, clear, and exact description of the invention, such as will enable others skilled in the art to which it appertains to make and use the same.

This invention has relation to scrapers for two-row-lister cultivator-disks, for clearing the mud and other matter therefrom that may adhere to their faces as the disks are operated, in order to prevent them from becoming clogged and thus prevent them from performing their functions properly.

It is the object of the invention to connect the shank of the scraper with the bolt of an eye-bolt supported from the journal-pin of the disk through the medium of a coupling-nut in which the shank of the scraper may be adjusted, both axially and longitudinally, in order that the scraper may be adjusted with respect to the disk in any position that the exigencies of the case may require.

Figure 2:
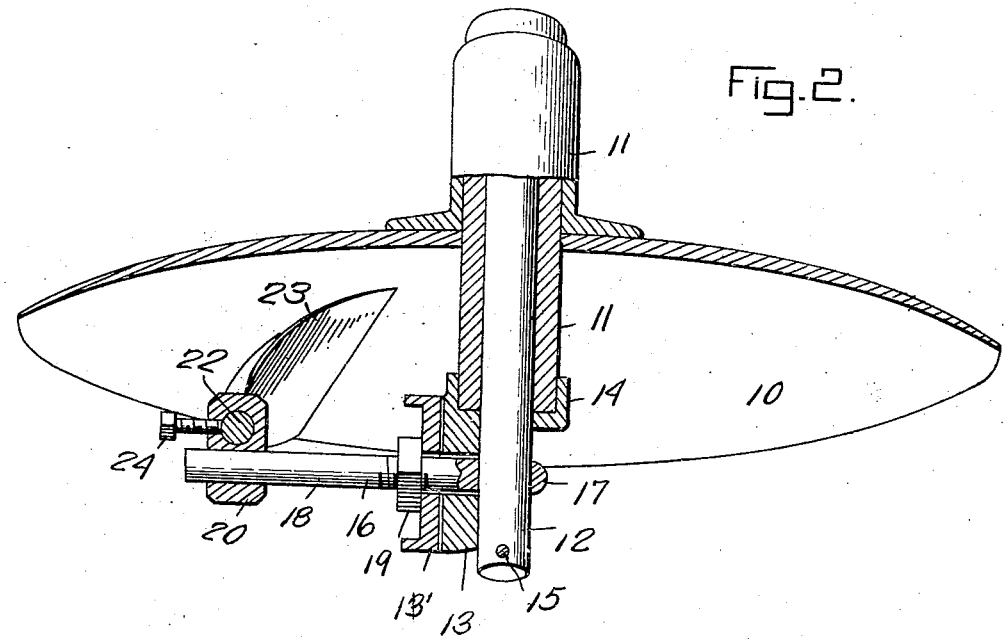
Figure 3:
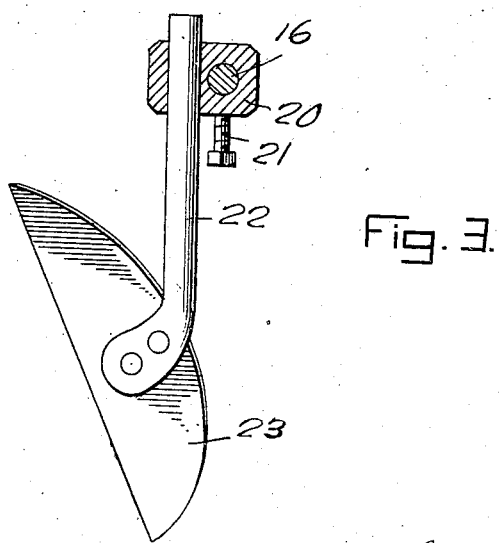

Of the said drawings—Figure 1 is a view of the concave face of a disk equipped with my improved scraper adjusting means. Fig. 2 is a central sectional view. Fig. 3 is a central section in the plane 3 3, Fig. 1. Fig. 4 is a sectional view in the plane of the eye-bolt, some parts being represented as in elevation.

Similar numerals of reference designate similar parts or features, as the case may be, wherever they occur.

In the drawings, 10 designates a disk of a two-row-lister cultivator having the usual bearing hub 11 extending from each side of the disk, through which hub there extends the journal-pin 12 on which the hub, which is practically a part of the disk, turns.

13 designates one member of the knuckle, a part 14 of which is formed as a flanged collar that is fitted over the outer end of the hub on the concave side of the disk, the journal pin extending through the said collar and a slotted bearing in one side of the member 13, the journal-pin being secured on said member by a key 15, passed through its outer end. The other member 13' of the knuckle has the usual adjustable connection with the member 13, and is connected with the cultivator frame, to support the disk through the medium of its hub.

16 designates a bolt having an eye 17 at its inner end through which eye the outer end of the journal-pin 12 is passed before receiving the key 15. The bolt passes through the knuckle members at a right angle to the journal-pin of the disk, and the lower part of the eye is drawn into a socket formed in the knuckle-member 13 so as to hold the end of the journal pin closely down on its slotted bearing in the member 13.

The nut 19 is turned on the eye-bolt below the eye and up against the knuckle-member 13' to assist the said bolt in performing the functions heretofore ascribed to it.

The outer end of the shank 18 of the eye-bolt passes through a hole in a coupling nut 20 adapted to receive it and said bolt is fixed in the hole in the coupling nut by a set-screw, 21.

22 designates the shank of the scraper 23 which is passed through a hole in the coupling-nut at a right angle to the extension of the shank 18 of the eye-bolt therethrough, and is fixed in place in said coupling-nut by a set-screw, 24. The outer end portion of the scraper-shank that is connected to the scraper is curved inward so as to assist in bringing the scraper into proper position with relation to the face of the disk, from which it clears the adhering mud and dirt.

Through the intervention of the coupling-nut on the shank of the eye-bolt and which connects the said bolt with the shank of the scraper, the latter is made adjustable as may be desired.

The given office of my improvements is to secure the requisite nicety of adjustment of the scraper with respect to the face of the disk, to suit the varying circumstances and conditions under which it operates.

Anything less than the improvement claimed will not answer the purposes of the invention.

What is claimed is—

1. The combination, with the cultivator disk and its journal pin, of an eye-bolt on the journal-pin, a coupling-nut adjustable on the eye-bolt, and a scraper for the disk and its shank, the latter being adjustably secured in the coupling-nut, at right angles to the eye-bolt.

2. A cultivator disk having a journal pin, an eyebolt engaged therewith, combined with a disk-scraper having a shank, and a coupling nut with which the said bolt and shank are severally adjustable both longitudinally and axially, the shanks of the disk-scraper and eye-bolt extending at right angles to each other.

In testimony whereof, I affix my signature, in presence of two witnesses.

WALTER E. WILHELM.

Witnesses:
 CHAS. MARSHALL,
 J. M. LATIMER.